United States Patent [19]

Dimov et al.

[11] 4,321,863

[45] Mar. 30, 1982

[54] FRUIT AND VEGETABLE PROCESSING APPARATUS

[75] Inventors: Peter S. Dimov, Novi Krichim; Georgi N. Pavlov; Atanas N. Stoyanov, both of Plovdiv; Ivan D. Nankinov, Novi Krichim, all of Bulgaria

[73] Assignee: DSO "Bulgarplod", Sofia, Bulgaria

[21] Appl. No.: 147,539

[22] Filed: May 7, 1980

[51] Int. Cl.³ .......................... A23N 7/00; B02B 3/12; B02C 11/08
[52] U.S. Cl. ....................................... 99/470; 99/472; 99/483; 99/517; 99/536; 99/584
[58] Field of Search ................ 99/470, 471, 472, 493, 99/483, 484, 516, 517, 535, 536, 584, 586, 623, 628, 629

[56] References Cited

U.S. PATENT DOCUMENTS

| | | | |
|---|---|---|---|
| 2,616,819 | 11/1952 | Ford | 99/629 |
| 3,052,209 | 9/1962 | Werther et al. | 99/472 |
| 3,276,496 | 10/1966 | Warren | 99/493 |

Primary Examiner—Philip R. Coe
Assistant Examiner—Timothy F. Simone

[57] ABSTRACT

Apparatus for continuously processing produce such as fruits and vegetables. The produce is heated by being fed into a pipe coil immersed in hot water and is sucked from the coil by vacuum into an expansion chamber where it is subjected to cold water which then travels with the treated produce under the influence of the vacuum. The cold water traveling with the treated produce is thereafter separated from the produce and is returned to the cold water source.

4 Claims, 2 Drawing Figures

FRUIT AND VEGETABLE PROCESSING APPARATUS

This invention relates to an apparatus for the processing of fruits and vegetables, such processing including tomato peeling, apple canning, juice de-airation, etc.

A known device for the processing of vegetables comprises a water bath in which there is disposed a vertical shaft with a cone fitted to it. On the external surface of the cone a second cone is mounted on the internal surface of which there is fitted a spiral member forming a helical slot for the processing of fruits and vegetables. The outer cone is lined with rubber or abrasives. To the upper fillet of the helical slot there is connected a pipeline for feeding water or air between the spiral and the abrasive surface. In the lower part of the bath there is provided an inclined elevator to remove the cleaned vegetables as well as a device for separating the vegetable waste. The mechanical transportation and peeling of the vegetables results in an impairment of the tissue under their skins; this is a disadvantage of such known device.

Another known device for the peeling of fruits and vegetables under vacuum consists of a water bath in which there is disposed a rotor composed of a shaft with spokes to which there are fitted buckets of parellelepiped shape. Two perforated cylinders are affixed concentrically to the parellelepiped buckets. In its upper part the internal cylinder becomes a launder, and a vacuum chamber is mounted immediately before the lauder connected to a vacuum receiver by means of a vacuum line.

A basic defect of this device is its periodic operation, mechanical sealing of the rotor inside the drum, as well as its fixed maintenance during its operation wherein a low and unstable vacuum is produced. Furthermore, mechanical transportation of the fruits and vegetables along the two perforated cylinders damages them.

It is among the objects of this invention to provide an apparatus for the processing of fruit and vegetables which operates continuously under a high and stable vacuum.

A preferred embodiment of apparatus in accordance with the invention comprises an input tank filled with hot water in which there is disposed a pipe coil the input of which is connected to a conical perforated receiver and the output of which is connected to an expansion chamber. A second tank is disposed close to the input tank and, by means of a pipeline emersed in it, is also connected to the expansion chamber or tank to which a pipeline is fitted the free end of which is submerged in yet a third, cold water tank. The cold water tank is connected by a pipeline to an output coldwater tank in which a U-shaped pipeline is submerged the U-shaped horizontal section of such pipeline being perforated. The outgoing end of the U-shaped pipeline is raised above the water level of the last named tank, and its other end is connected by a pipe to a vacuum pump which is connected to the expansion chamber. The water level in the second tank is lower than that in the input tank. The third tank and a second circulation pump are connected to the cold water or output tank.

The produce such as fruits and vegetables is heated by being fed into the pipe coil emersed in hot water and together with hot water from the tank is sucked by vacuum through the pipe coil into the expansion chamber where it is subjected to cold water which then travels with the treated produce under the influence of the vacuum. The cold water travelling with the treated produce is thereafter separated from the produce and is returned to the cold water source, which in this case is the cold water tank. The hot water from the hot water tank which has accompanied the fruit or vegetables to the expansion chamber is separated therefrom and returned to the second tank from which it is recirculated to the first, inlet tank.

The device for the processing of fruit and vegetables according to this invention has the following advantages: there is a continuous process of production as a result of which labor productivity is increased, and the conditions of work are improved, the damage to the manipulated fruit and vegetables from the hydraulic sealing of the vacuum and the transportation of the product is reduced, and the structure is compact and simple.

The invention is further explained by means of the attached drawings, in which.

Figure 1:
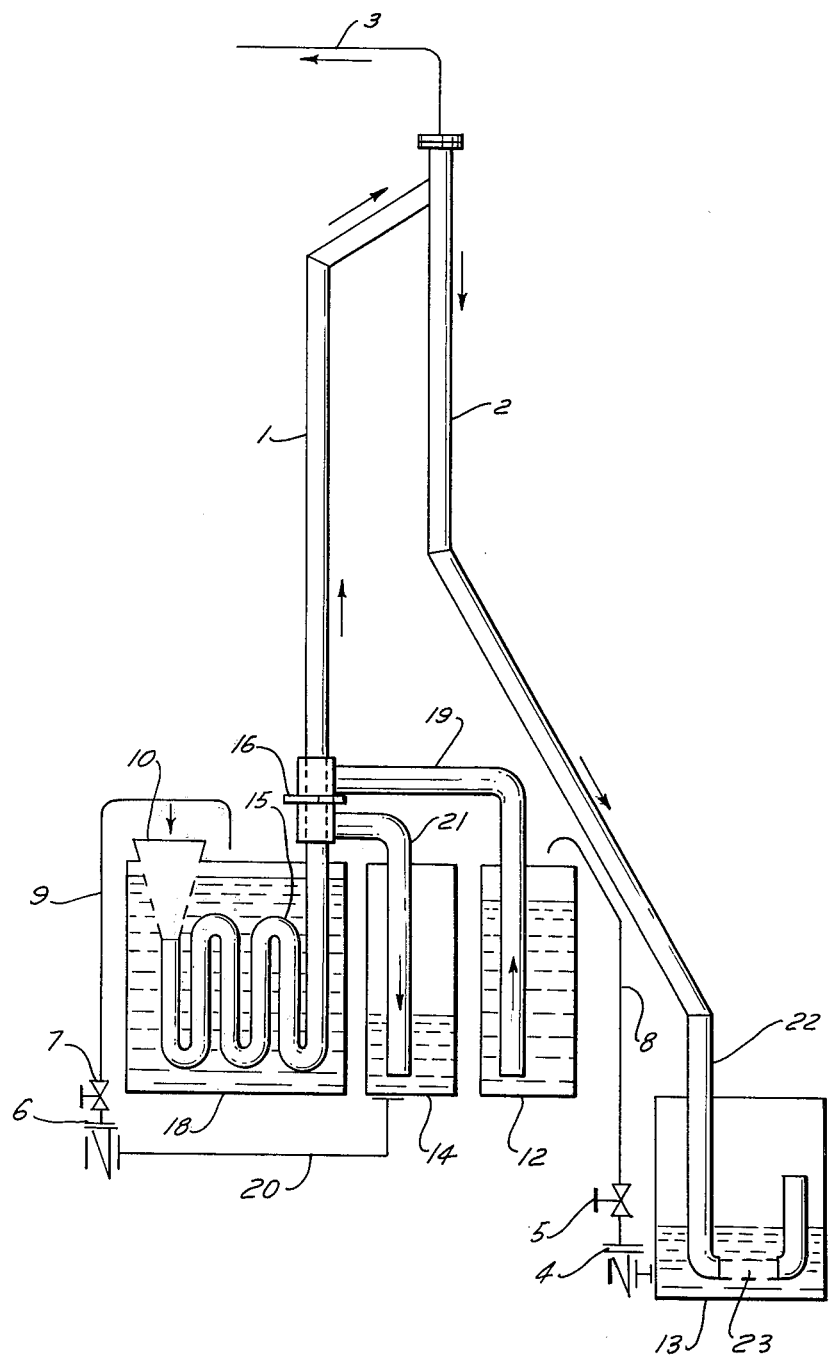
FIG. 1 is a general view partially in side elevation and partially in vertical section of a first embodiment of apparatus in accordance with the invention for the handling of food and vegetables.

Turning first to FIG. 1, the apparatus there shown consists of an input tank 18 filled with hot water which contains a pipe coil 15 the input of which is connected to a perforated connical receiver 10, and the output of which is connected to an expansion chamber 16. A second tank 14 is disposed near the input tank 18 and the former is also connected to the expansion tank 16 by means of a pipeline 21. The free end of pipe 21 is submerged in the water of the second tank 14 the level of which is lower in the water of the input reservoir or tank 18. This level difference in the two hot water tanks 14, 18 is maintained constantly at this level by means of recirculation pump 6 which such water by means of pipeline 20 from the bottom of the second tank 14 and sends it to the input tank 18 through pipe 9. The regulation valve 7 is designed to regulate the level of tanks 14, 18 and it is mounted to the pump. The system of two tanks 14, 18 and pump 6 effects a recirculation of the hot water.

In addition to tanks 14, 18 this equipment also has a third tank 12 for cold water which similiarly to the second tank 14 is connected by means of pipe 19 to expansion chamber 16 above the pipeline 20. The third tank 12 is connected by means of pipeline 8, regulating valve 5 and a second recirculating pump 4 to an output cold water tank 13 located at a level lower than the third tank 12.

In the output tank 13 there is a broad U-shaped pipeline 22 the horizontal section 23 of which is perforated and its outgoing end is raised above the water level and is mounted inside tank 13. The other end of the U-shaped pipeline 22 is connected to a pipe 3 which in turn is connected to a vacuum pump (not shown). To pipe 2 by means of pipeline 1, there is connected the expansion chamber 16. In the outgoing tank 13 a water level lower than the outgoing end of the U-shaped pipelines is maintained by means of the second recirculation pump 4 and the regulating valve 5. Constant recirculation of the cold water is maintained in the third tank 12, the pipelines 1, 2, tank 13 and second recirculation pump 4 as a result of the vacuum established in pipe 3.

The equipment of FIG. 1 operates in the following manner. First recirculation pump 6 is actuated to start the recirculation of the hot water between the ingoing tank 18 and the second tank 14. The vacuum pump attached to pipe 3 and the second recirculation pump 4 for cold water are started at the same time. Under the effect of the vacuum, the cold water of the third tank 12 rises in pipeline 19 and returns to the outgoing tank 13 by means of pipes 1 and 2. Tomatoes for peeling are fed to the receiving device 10 where under the effect of the vacuum, together with the hot water, they pass through coil 15 on their way to expansion chamber 16. There the product is taken up by the second cold water recirculation loop, the water coming from pipeline 19, and by means of pipelines 1, 2, and the U-shaped pipe 22 are forwarded to further processing apparatus (not shown).

Figure 2:
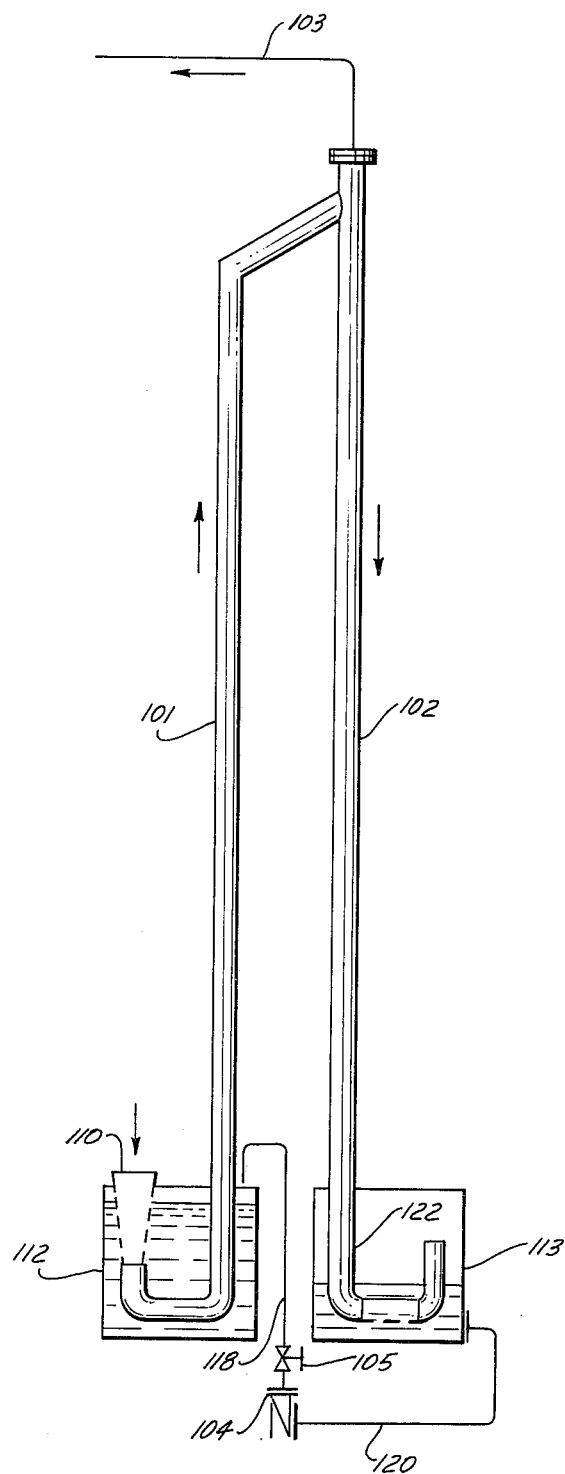
FIG. 2 is a similar view of a second embodiment of apparatus in accordance with the invention.

In FIG. 2 there is shown equipment for the vacuum processing of apples. Such apparatus includes a receiving tank 112, in which the pipe coil has been replaced by a U-shaped tube which by means by a pipeline 101 is connected to pipeline 102 and connected to the outgoing or output tank 113 which is similar to the upward tank in the first embodiment of the apparatus. A recirculating pump 104, by means of pipelines 118 and 120 effect the transfer of fluid from the outgoing tank 113 to the ingoing or input tank 112. Beyond the junction between the pipes 101 and 102, there extends a pipe 103 which is connected to a source of vacuum (not shown).

Under the effect of vacuum from pipe 103 the fruit fed to receiving device 110 rises in pipeline 101 and by means of pipeline 102 and the U-shaped tube 122 the cold water returns to the outgoing tank 113. The processed fruit is forwarded for further processing by the vacuum established in pipe 103.

In cases in which the vacuum apple processing equipment of FIG. 2 is used as a device for the de-airation of fruit juices, the recirculation pump 104 is switched off, that is out of operation, and the ingoing tank 112 and the outgoing tank 113 are filled with fruit juice for de-airation.

Although the invention is illustrated and described with reference to a plurality of preferred embodiments thereof, it is to be expressly understood that it is in no way limited to the disclosure of such preferred embodiments, but is capable of numerous modifications within the scope for the appended claims.

We claim:

1. Apparatus for treating produce such as fruits and vegetables, comprising a pipe having an inlet end immersed in a hot water tank, a perforated receiver connected to said inlet end of the pipe to receive produce to be treated and hot water from the tank, an expansion chamber connected to the outlet end of the tank, a pipeline connected to said expansion chamber, a source of vacuum connected to said pipeline, said pipeline receives and forwards treated produce under the influence of vacuum from said expansion chamber, means to separate hot water from the produce in said expansion chamber, and means to subject the treated produce to cold water as the produce travels away from said expansion chamber.

2. The apparatus according to claim 1, wherein treated produce and hot water travel into the expansion chamber, and comprising means for separating such hot water from the treated produce received in the expansion chamber.

3. The apparatus according to claim 1, comprising means for separating from the produce the cold water to which the produce is treated as it travels away from the expansion chamber.

4. The apparatus according to claim 3, comprising means to recirculate the cold water separated from the treated produce by reintroducing it into the expansion chamber.

* * * * *